United States Patent Office 3,457,198
Patented July 22, 1969

3,457,198
GRAFT POLYMERIZATION OF ACRYLIC ACID-ESTER MIXTURES TO CELLULOSE
Igor Sobolev, Albany, Calif., assignor to ITT Rayonier Incorporated, Shelton, Wash., a corporation of Delaware
No Drawing. Continuation of application Ser. No. 155,493, Nov. 28, 1961. This application Mar. 15, 1967, Ser. No. 624,663
Int. Cl. C08b 23/00; C08f 25/00
U.S. Cl. 260—2.2      3 Claims This is a continuation of application Ser. No. 155,493, filed Nov. 28, 1961.

This invention relates to graft copolymers of cellulose, and has for its object the provision of an improved process for grafting the polymerizable monomers acrylic acid or methacrylic acid on to cellulose or cellulosic materials (for convenience, hereinafter simply called cellulose). More particularly, the invention comprises the grafting of such monomers on the cellulose chain in an aqueous system and in the presence of an acidified manganic phosphate initiator.

The process of the invention is preferably controlled to graft such a limited amount of polymer on the cellulose that the physical nature of the cellulose is not appreciably changed but is improved in certain of its properties. The invention provides new and improved cellulosic products, as to both physical form and chemical composition. Certain products of the invention have properties making them especially useful as ion-exchangers.

The process of the invention can be applied effectively to cellulosic materials having reactive sites on the cellulosic chains including carboxyl, keto and aldehydic groups. If such reactive sites are not present to provide sufficient anchor points on the cellulosic chains for grafting the polymers, they can easily be added by means of a mild oxidative treatment prior to grafting, either as a separate processing step or in combination with some step used in preparing the original cellulosic material. For the purpose, a mild hypochloride bleach is usually preferable but other means can be used such as mild peroxide, periodate and permanganate treatments. A broad range of cellulosic materials are suitable as base materials. Among these are films, filaments, yarns, fabrics, papers and pulps of cotton and cotton linters, wood pulp, regenerated cellulose and the various cellulosic derivatives such as cellulose acetate and hydroxyethylcellulose.

The initiator system used in the invention comprises an acidic aqueous solution of a salt or complex of trivalent manganese with a suitable polyphosphate. The acids from which such phosphates are derived, i.e., the hydrogen form of the same, can be represented by the formula

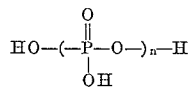

where $n$ is $\geq 2$ for linear molecules, and

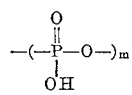

where $m$ is $\geq 3$ for cyclic molecules.

Examples of such phosphates are pyrophosphate ($n=2$), tripolyphosphate and the various cyclic and linear condensed phosphates of higher molecular weight, generally classed as "metaphosphates." Of the foregoing the pyrophosphate is the most efficient and is preferred.

The function of the polyphosphates in the initiator system is to stabilize the manganic ion by complexing it without excessively reducing its oxidizing power. Other known complexing agents for manganic ion either decrease its oxidizing power excessively or fail to stabilize it. For example, under the conditions of the invention, orthophosphates do not prevent manganic ion from disproportionating into divalent and tetravalent forms according to the following reaction:

While the initiator used in the process of the invention can be prepared by several methods such as electrolytic oxidation of a manganous salt in the presence of a polyphosphate, the preferred method is to react a manganous salt with permanganate in an acidified solution of the polyphosphate. The initial concentration of the complexed manganic ion in the graft polymerization mixture can range from about 0.000005 to 0.05 moles per liter. Phosphorus atoms can be present in a ratio from about 2:1 to 40:1 phosphorus atoms per manganic ion while the preferred range is from about 4:1 to 10:1. Soluble salts such as the sodium and potassium polyphosphates or the corresponding acids can be used without difficulty.

In the process of the invention, the compounds that are grafted onto the reactive sites of the cellulosic chains are the polymerizable acrylic acid or methacrylic acid, or combinations thereof.

The acidic monomers acrylic acid and methacrylic acid, by themselves do not graft onto cellulosic materials efficiently by the process of my invention. I have discovered, however, that if such monomeric acids are combined, even in a relatively low ratio, with neutral monomers such as methyl methacrylate, methyl acrylate and acrylonitrile grafting will take place quite readily. Surprisingly in such cases the resulting graft copolymer is a completely novel, weakly acidic, high-capacity, cellulosic cation exchanger. Products of this type, of course, have a special utility in operations where filtration is combined with the removal of metallic ions by ion-exchange, as for example, in the fruit juice and beverage industries.

Using the foregoing reagents, the process of the invention is relatively simple and quite flexible. In carrying out a process of the invention, the cellulosic material and monomeric grafting reagent are placed in a suitable closed vessel and depending upon the form and nature of the cellulosic component slurried or immersed in the desired amount of water which may vary from 1 to 1000 parts per part of cellulose. The air is displaced by an inert gas such as nitrogen to remove the oxygen from the reaction zone. The pH is adjusted to below 7 and preferably between about 1 and 2 with a suitable mineral acid such as sulfuric, hydrochloric, nitric, perchloric, phosphoric, etc., and the acidic manganic pyrophosphate initiator added. Grafting of the monomer onto the cellulosic material will take place at temperatures ranging from about 0–60° C., with grafting efficiencies ranging up to nearly 100 percent. Grafting efficiency is defined as the percentage of total polymer chemically linked, i.e., grafted, to the cellulosic polymer. The preferred range is from about 20 to 40° C. with the reaction slowing down sharply below about 20° C. and with efficiency dropping off above 60° C. and the initiator becoming unstable and eventually decomposing. When operating between about 20 to 40° C. the reaction time required for substantial completion of grafting will vary from about 30 to 120 minutes depending upon the temperature and other operating conditions and the nature of the monomer used. Pressure has little effect on the reaction and for convenience is preferably kept around atmospheric. When the desired amount of monomer has been grafted onto the cellulosic material the product can then be washed acid-free and dried by the usual methods for the type of product involved.

In the process of this invention, polymerization and grafting of the monomer is believed to be initiated by the formation of free radical intermediates during oxidation of the indicated reactive sites on the cellulosic chains by the manganic salt. Since essentially all such free radicals are accordingly produced only on the cellulosic chain polymer, the formation of ungrafted homopolymer (an undesirable side reaction) is kept to a minimum. Using the process of the invention I have found that any desired amount of the monomer (up to about 100 percent by weight based on the cellulosic material) can be readily and controllably added on at grafting efficiencies approaching 100 percent.

The products produced in the process of the invention have such improved properties as greater wet and dry strengths, high electrical resistance, water resistance, aging resistance and better color, and are high-capacity cellulosic cation exchangers.

The following is an example of a process carried out according to my invention:

A 250 gram portion of a southern pine kraft-type bleached paper pulp was slurried with 2000 mls. of water in a stirrer-equipped stainless steel reactor. The slurry was deaerated with nitrogen and an atmosphere of the same maintained during the ensuing grafting operation. 28 grams of inhibitor-free methyl methacrylate and 202 grams of inhibitor-free methacrylic acid were stirred into the slurry. Grafting was initiated by adding a manganic pyrophosphate solution prepared by adding 9.2 grams 96 percent sulfuric acid, 6.70 grams technical-grade (99%) tetrasodium pyrophosphate, 2.18 grams technical-grade (75%) manganous sulfate and 0.41 grams technical-grade (98%) potassium permanganate to 120 mls. of cold water. Grafting was continued under an atmosphere of nitrogen for 2 hours with constant agitation of the slurry during which time the temperature rose from 25 to 34° C. The final pH was 1.7. The product was extracted with 2 percent sodium bicarbonate solution at ambient temperature to remove ungrafted polymer and other alkali-soluble impurities that might be present after which it was washed, acidified and rewashed until substantially ash-free and dried in the usual manner. Analysis indicated that the finished product contained 3 percent methyl methacrylate and 12 percent methacrylic acid units based on the weight of the cellulose present.

The ion exchange capacity of this grafted copolymer product was found to be 1.5 meq./gram for sodium ion which decreased only very slightly to 1.4 meq./gram after 3 regeneration cycles using 1 N hydrochloric acid for regeneration. Experiments indicated that the exchanger could be used in a similar manner to remove other metallic cations including polyvalent ions such as $Ni^{+2}$, $Co^{+2}$, $Fe^{+3}$, $Cr^{+3}$, etc., from dilute solutions of their salts. The cations absorbed on the exchanger cannot be eluted with de-ionized water but can be displaced with 2 M solutions of some other cations such as Na in the form of $NaClO_4$.

I claim:

1. The process for grafting an acid monomer onto cellulose to form reaction products while retaining the general physical structure or form of the untreated cellulose which comprises providing cellulose having reactive sites along the cellulose chain, treating the cellulose in an aqueous acid system with (a) an acid monomer of the group consisting of acrylic acid and methacrylic acid and (b) a neutral monomer of the group consisting of methyl methacrylate and methyl acrylate in the presence of an initiator consisting of a magnetic polyphosphate, thereby forming copolymer chains of the acid monomer and neutral monomer on the cellulose, said copolymer chains being chemically bound to the cellulose such that they are not removed by washing in dilute aqueous sodium bicarbonate solution.

2. In the process of claim 1 using as an initiator an acid solution of a trivalent manganese compound and a phosphate of the group consisting of pyrophosphate, tripolyphosphate and metaphosphate.

3. The improved cellulosic ion exchanger having grafted along the cellulosic chain, copolymer chains of (a) monomers of the group consisting of acrylic acid and methacrylic acid and (b) neutral monomers of the group consisting of methyl methacrylate and methyl acrylate, said copolymer chains being chemically bound to the cellulose such that they are not removed by washing in dilute aqueous sodium bicarbonate solution.

References Cited

UNITED STATES PATENTS 3,083,118  5/1963  Bridgeford _____ 117—47

FOREIGN PATENTS 1,221,901  1/1960  France.
886,552  1/1962  Great Britain.

WILLIAM H. SHORT, Primary Examiner

M. GOLDSTEIN, Assistant Examiner

U.S. Cl. X.R.

8—116; 260—17, 17.4